March 24, 1964     H. A. SPILMAN ETAL     3,126,289
DRY MILK PROCESS OF MANUFACTURE
Filed Sept. 1, 1960     2 Sheets-Sheet 1
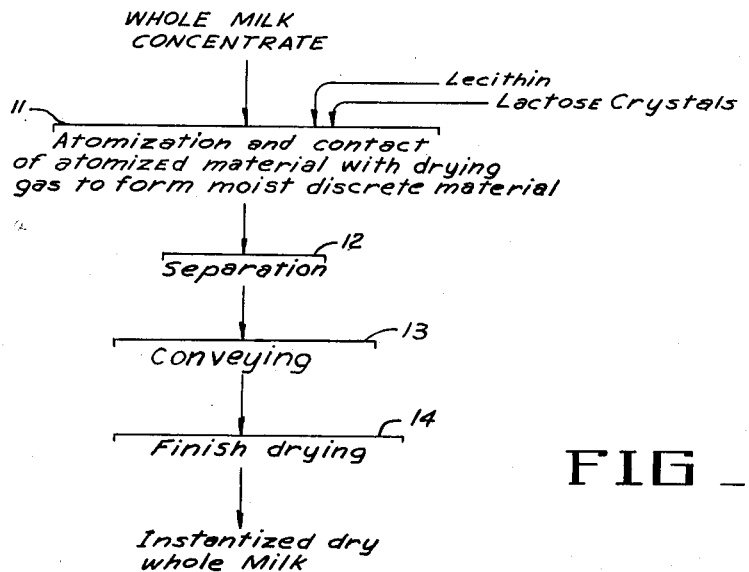
FIG_1_
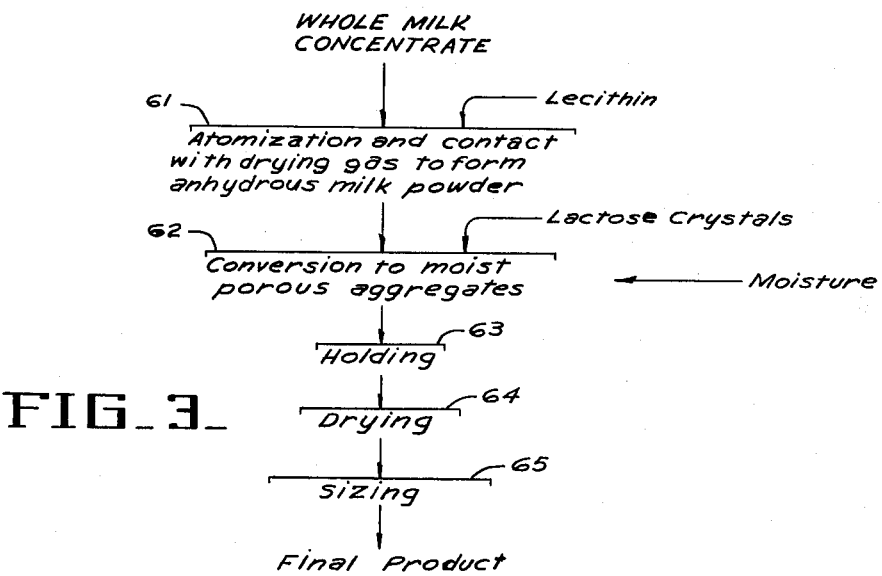
FIG_3_
INVENTOR.
Herbert A. Spilman
Louis J. Nava
BY
ATTORNEYS March 24, 1964 H. A. SPILMAN ETAL 3,126,289
DRY MILK PROCESS OF MANUFACTURE
Filed Sept. 1, 1960 2 Sheets-Sheet 2
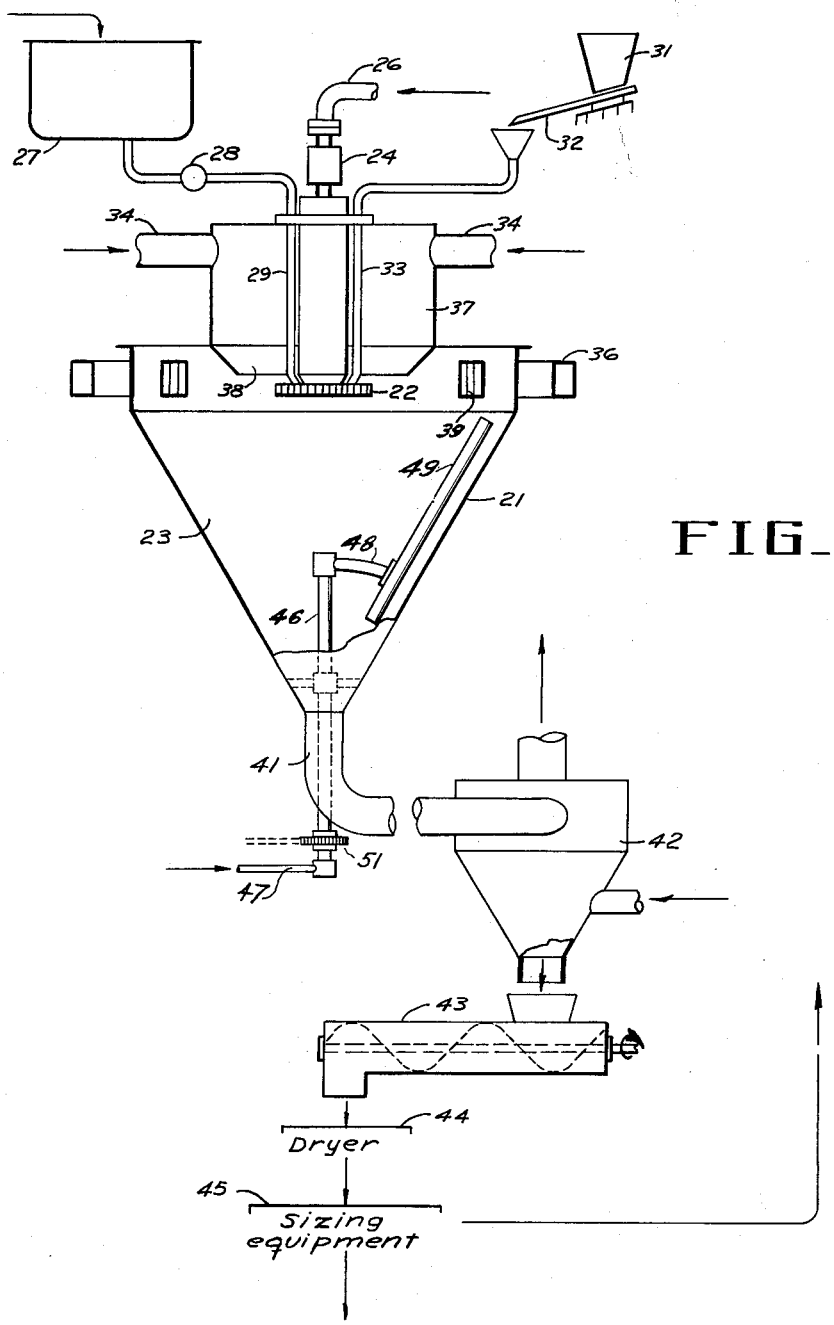
FIG_2_
INVENTOR.
Herbert A. Spilman
Louis J. Nava
BY
ATTORNEYS

United States Patent Office 3,126,289
Patented Mar. 24, 1964

---

3,126,289
DRY MILK PROCESS OF MANUFACTURE
Herbert A. Spilman, Belvedere, and Louis J. Nava, Redwood City, Calif., assignors to Foremost Dairies, Inc., San Francisco, Calif., a corporation of New York
Filed Sept. 1, 1960, Ser. No. 53,498
4 Claims. (Cl. 99—203)

This invention relates generally to dry fat containing milk products, and processes for their manufacture.

So-called "instant" dry milk differs from the normal spray dried product in that it has good wettability, and it can be readily dispersed in cold water by simple stirring. It differs from conventional spray dried milk in that, in contrast with the small particle size possessed by spray dried milk, the individual fragments are in the form of aggregates which have a size such that the bulk of the fragments remain on a 100 mesh screen. Such an aggregated product has high wettability whereby when a quantity of the powder is deposited upon the surface of cold water, the powder mass wets and sinks within a short interval with simple stirring.

In general two types of processes have been used to produce the instant form of dry milk. The one type (straight through) commences with a liquid milk concentrate and proceeds directly to the formation of porous aggregates. The other type (wet back) applies moisture to spray dried anhydrous milk powder to make the individual particles sticky, after which the sticky particles are brought into random contacts to form porous aggregates. In either instance, it has been found that when the processes are employed for the production of products having a substantial fat content, such as whole milk, the final product does not have the instant properties to the degree desired for commercial products. Particularly when a quantity of such material is deposited upon the surface of cold water it does not tend to wet and sink in the same manner as instantized nonfat milk solids, but on the contrary tends to float, and when stirred, sticky lumps are formed.

It has been known that the presence of small amounts of added lecithin tends to promote the wettability and dispersibility of dry milk. In co-pending application Serial No. 673,893 of July 19, 1957, now abandoned, there is disclosed a novel process whereby small amounts of lecithin are effectively incorporated in an instantized fat containing dry milk. The benefits obtained by the use of that process are greatly superior to the effects obtained by homogeneously incorporating small amounts of lecithin with the fat fraction of the milk, before normal spray drying. The process disclosed in said application No. 673,893 incorporates the lecithin as an essentially separate component without homogeneously incorporating the lecithin with the fat fraction, and it is applicable to both the above mentioned "straight through" and "wet back" procedures. One problem involved in the effective incorporation of lecithin is the attainment of uniform distribution. Lack of uniform distribution, which may be experienced with the procedures described in said application No. 673,893, tends to reduce the efficient use and the desired effectiveness of the lecithin.

In general it is an object of the present invention to provide an improved process for the production of fat containing dry milk having added lecithin.

A further object of the invention is to provide a process of the above character which in particular is applicable to the manufacture of instantized fat containing dry milk.

Another object of the invention is to provide an improved instantized fat containing dry milk product, which incorporates small amounts of lecithin distributed in such a manner as to greatly improve wettability and dispersibility.

Additional objects of the invention will appear from the following description in which the preferred embodiments have been set forth in detail in conjunction with the accompanying drawing.

Referring to the drawing:

FIGURE 1 is a flow diagram illustrating one procedure for carrying out the invention;

FIGURE 2 is a schematic view illustrating equipment for carrying out the process;

FIGURE 3 is a flow diagram illustrating use of the invention in the wet back process.

Lecithin is a known emulsifying and wetting agent (or surface active agent) and has been used in the food industry for a variety of applications. If small amounts of lecithin are mechanically intermixed with dry whole milk powder, wettability and dispersibility of the powder in cold water is not materially benefited. If the lecithin is homogeneously incorporated in the milk before spray drying to form a dry powder, whereby it is dissolved in the fat fraction, there is some improvement in wettability and dispersibility, but not to an extent comparable to the results obtained from the present process. The present invention utilizes a novel procedure for the incorporation of lecithin in fat containing dry milk, and is predicated upon our discovery that lecithin can be contacted with the liquid milk at the time of or immediately before spray drying, to obtain the results desired, provided the conditions are such that the lecithin does not become dissolved in the fat fraction to any substantial extent.

The process and equipment of FIGURES 1 and 2 is of the straight through type, and incorporates features disclosed and claimed in Patent 2,921,857. A whole milk concentrate, such as one containing from 40 to 50% solids, as shown being supplied to step 11, where the milk is atomized and the atomized droplets contacted with drying gas to form a moist discrete material, containing, for example from 6.5 to 13% moisture (as determined by one-hour toluene moisture determination). In step 12 the discrete material is separated from the drying gas, and thereafter the moist material conveyed is in step 13 to the finish drying step 14, the latter being carried out by the use of suitable drying equipment, such as that described in said Patent 2,921,857, which will not crush or break up the aggregates to any substantial degree.

Step 11 is shown receiving lecithin in liquid form for incorporation into the product. As will be presently explained, the lecithin introduced at this point is supplied in such a manner that it is brought into contact with the liquid milk concentrate at the time of or immediately prior to atomization.

FIGURE 1 also illustrates lactose crystals being supplied to step 11, thereby supplying seed crystals tending to promote crystallization of the lactose content to the form of alpha lactose monohydrate. The use of lactose crystals for such seeding is disclosed in Patent No. 2,728,678.

Lecithin is the commercial or popular name for a mixture of compounds which may be more accurately designated as phosphatides or phospholipids. The phosphatides are complex organic compounds that are similar to the fats or lipids, but which differ enough from fats to give them unique properties. Lecithins of vegetable oil origin are mixtures of phosphatides produced from such materials as cotton seed oil, corn oil, or soybean oil. Products from current commercial treatments modifying natural lecithin to emphasize either the lipophilic groups or the hydrophilic groups, may be used for our purpose. Commercial soya lecithin has been used with good results. It is commercially available as a liquid material with lecithin dispersed in a soybean oil carrier.

Thus we may use a commercial liquid lecithin product of this character containing about 60% lecithins, whereby for each 100 pounds of the final dried product, there is substantially from 0.25 to 1.0% of the lecithin product (i.e. 0.17–0.6% lecithins).

The equipment schematically shown in FIGURE 2, for carrying out the procedure of FIGURE 1, is as follows. The spray drier 21 is of the Peebles type, and in general may be constructed in accordance with Peebles Patent No. 2,595,119. A centrifugal atomizer head 22 is mounted axially of the drying chamber 23, and may be one of many types known in the art. Preferably we select an atomizer head which will form atomized droplets with reasonable uniformity as to size, and which has a central feed well or space into which the liquid concentrate is supplied.

In FIGURE 2 it is assumed that the rotary shaft which mounts the head 22 is driven by suitable external means, such as a motor driven belt which engages the pulley wheel 24. Also it is assumed that the shaft is hollow and is coupled to the pipe 26, whereby the liquid feed to be atomized is supplied into the central feed well of the atomizer head. The liquid lecithin product is supplied from the small tank 27, which connects through the control valve 28 with the pipe 29. The lower end of this pipe delivers the lecithin at a controlled rate into the feed well of the atomizer head.

Hopper 31 serves to supply seed crystals of alpha lactose monohydrate to the shaker conveyor 32, which delivers the crystals at a controlled rate to the pipe 33. The lower end of this pipe discharges the crystals into the feed chamber of the atomizer head.

Hot drying gas is introduced into the drying chamber 23, by the way of the conduits 34, and the manifold 36. Conduits 34 connect with the plenum chamber 37, which is mounted on top of the spray drying chamber, and which has a downwardly directed annular opening 38 that discharges hot drying air downwardly about the atomizer head 22. Manifold 36 communicated with the upper peripheral wall of the drying chamber through the louvered openings 39, whereby hot air is introduced into the upper part of the drying chamber in generally tangential directions.

Control of the spray drying operation, including the inlet temperature of the drying air, the flow rates of the air and the amount of liquid material being supplied to the atomizer head, can be in accordance with the disclosure of said Patent No. 2,921,857 to produce the desired moist discrete material in the form of aggregates.

The moist discrete material produced by the spray drier 21 is removed through conduit 41 and is delivered to the separator 42, which may be of the cyclone type as illustrated. The material removed in this cyclone is shown being conveyed by suitable means such as a scroll device 43, to the finished drier 44. From the drier 44 the material may be treated by the sizing equipment 45, with the return of undersize reject material back to the process.

When the equipment is to be used for prolonged commercial operations, it is desirable to provide an air sweep for dislodging material from the side walls of chamber 23. Thus we have shown a hollow rotary shaft 46 connected at its lower end with an air supply pipe 47. Hollow arm 48 connects the inner end of the shaft to the perforated sweep pipe 49. Air fitting from pipe 49 is directed against the side walls to dislodge accumulated material. The shaft 46 is rotated at a constant speed, as by means of the driven sprocket 51.

The final product produced by the procedure and equipment described above is in the form of porous aggregates, with the individual aggregates being formed by powder milk particles firmly bonded together in random fashion. The formation of such aggregates takes place by virtue of random contacts between the spray dried particles while they are moist and sticky.

The scroll 43, when used to convey the moist material, may consist of a tubular casing together with an interior rotating device, consisting of a helicoidal ribbon mounted upon a rotating shaft. The ribbon gently agitates and turns over the discrete moist material, and causes the material to move toward the discharge end of this device. Agitation within the scroll is insufficient to cause any substantial amount of crushing or breakage of the aggregates. When the scroll is omitted, the spray dryer 21 is adjusted whereby the degree of stickiness of the particles is such that during transit from the spray dryer through the collecting cyclones and into the finish dryer, random contacts occur with function of the desired moist aggregates.

The size of the aggregates, and the bulk density of the final product, is dependent somewhat upon the manner in which the process is controlled. However, in general, the aggregates are of such size that the bulk of the material will remain upon a 100 mesh screen, but will pass through an 18 mesh screen.

In general, the product obtained from the foregoing described process has excellent instant properties. When a quantity of the product is deposited upon the surface of cold water, the water penetrates the mass and the individual porous aggregates, without blocking, whereby the entire mass quickly wets and sinks with simple stirring applied either simultaneously with depositing the powder or immediately thereafter. Thus the product can be readily dispersed in cold water to form a stable reconstituted milk without formation of lumps. A substantial part of the lactose present is in the form of alpha lactose monohydrate, whereby the product is relatively nonhygroscopic. Reconstituted milk made by use of the product is substantially indistinguishable from fresh whole dairy milk. There is no impairment of palatability, flavor, or solubility.

In general, the lecithin content is incorporated in the aggregates in such a manner that it is not dissolved in the fat globules. It is associated with the milk solids and is distributed in the aggregates in such a manner as to materially affect the surface wetting properties of the material.

A feature of our process is that there is relatively uniform distribution of the lecithin with respect to the final product. In other words, upon a microscopic examination of the final product, it has been found that there are no solid particles of lecithin that are disassociated from milk solids, and all of the aggregates have a lecithin content to a high degree of uniformity. This makes for effective and efficient use of lecithin to obtain the desired instant characteristics.

In the foregoing, particular reference has been made to the manufacture of a whole milk product. A typical dried whole milk product having a moisture content of 2% may have a butterfat content of about 28%. It will be evident that our invention is applicable to products having a lower fat content than whole milk, as for example, products having a reduced fat content ranging from 7 to 28%. Also the fat content may be made greater than normal whole dried milk, as for example, from 28 to 72% (dried cream).

Although particular reference has been made to milk solids containing butterfat, various other fats or fatlike substances can be substituted for all or a part of the butterfat content. Such fats should be edible, relatively free from free fatty acids, and with a melting point of the order of 90 to 110° F. For example, reference can be made to any one of a number of edible hydrogenated vegetable oils such as hydrogenated cottonseed, peanut and corn oils.

Although our process is particularly applicable to the straight through process for producing an instantized milk product, it can be used with the wetback procedure as illustrated particularly in FIGURE 3. Thus whole milk concentrate is shown being supplied to the spray drying step 61 to produce a finely divided anhydrous milk powder. In other words, instead of controlling the spray drying in the manner disclosed in Patent 2,921,857 to produce a moist discrete material, the drying is controlled in accordance with conventional commercial spray drying technique, to produce an anhydrous spray dried powder having a particle size such that the majority of the material will pass through a 100 mesh screen.

As indicated in FIGURE 3, lecithin is fed to the centrifugal atomizer head in the same manner as previously described in connection with FIGURES 1 and 2. Thus lecithin is incorporated in the finely divided spray dried material, without being dissolved in the fat fraction. The anhydrous spray dried material is then supplied to the conversion step 62, which may be carried out by the procedure and equipment disclosed and claimed in Peebles 2,835,586. Assuming use of such equipment, the anhydrous milk powder is delivered to a converter chamber with a current of conveying air, where it is contacted with moisture sufficient to make the particles relatively sticky. It is desirable that the atmosphere in the moistening zone be at an elevated temperature as for example from 100 to 120° F., as by supplying hot water vapor together with atomized water. Within the converter chamber, the moist sticky particles come into random contact, thereby forming moist porous aggregates. As disclosed in said Patent 2,835,586, the amount of moisture added in step 62 may be sufficient to provide a total moisture content of 10 to 20%, for the material leaving the converter chamber. From the conversion chamber the aggregates are delivered to a conveyor belt, where the material remains in quiescent condition for a period such as from 10 seconds to 2 minutes, while it is being moved to a drier of the shaker type. In FIGURE 3, the holding period on the conveyor is indicated at 63, and drying is indicated at 64, to produce the final dry product in condition for packaging. After finishing drying, the material may be subjected to sizing at 65, to produce a final product for packaging which is relatively uniform.

The final product produced by the procedure of FIGURE 3 has substantially the same characteristics as the previously described product. In general the lecithin content does not become dissolved in the fat fraction during the conversion step at 62, but remains associated with the milk solids, and is distributed in such a manner as to enhance the surface wetting properties of the aggregates.

In both the straight through and the wetback procedures described above, the liquid lecithin is supplied directly to the feed chamber of the centrifugal atomizer head. The purpose of this is to bring the lecithin and liquid materials into contact immediately prior to atomization whereby there is no opportunity for the lecithin to become dissolved in the fat content. In some instances it may not be convenient to bring the lecithin into the atomizer head. In such cases the lecithin can be fed to the stream of milk entering the atomizer equipment, as for example, into the pipe 26. In such event there is somewhat longer contact between the lecithin and the liquid feed, but without, however, affording sufficient time for appreciable dissolution of the lecithin into the fat content.

Examples of our process are as follows:

*Example 1*

The procedure described in connection with FIGURES 1 and 2 was employed. A whole milk was concentrated by vacuum evaporation to 46% solids. The concentrate was pumped at a uniform rate through the atomizer head of a Peebles type drier substantially as previously described. Temperatures and flow rates of the drying air supplied to the spray drying chamber were adjusted whereby the discharging milk solids had a moisture content of 6.8%, as determined by the one hour toluene distillation procedure. A liquid lecithin product was supplied to the atomizer head in the manner previously described. The product used was a commercial soya lecithin manufactured by the W. A. Cleary Company. The amount of lecithin product used was such that it amounted to approximately 0.83% of the final dried product (that is, about 0.5% lecithin(s)). Seed crystals of lactose were simultaneously supplied to the atomizer head in the manner previously described. The amount of lactose thus added amounted to 0.1% of the lactose content of the concentrate. The size of the lactose crystals was such that the bulk of the crystals passed through a 300 mesh screen. The sweep shaft 46 was driven at 1 r.p.m. The material leaving the spray drier was at a temperature of from 90 to 100° F. Hot air was introduced through conduit 40 of FIGURE 2, at a temperature of about 250° F., whereby the product leaving the cyclone separator 42 was at a temperature of about 140° F. This material was received by the scroll 43, from which the moist materials was delivered to the drier 44, where it was contacted with drying air at a temperature of about 240° F. About 4 minutes' drying time was employed to produce a final product containing about 2% moisture. The final product was in the form of firm aggregates having a size such that the bulk of the material remained upon a 100 mesh screen, but passed through an 18 mesh screen. The product was tested for wettability by depositing 20 grams of the material upon the surface of 140 cc. of water at 70° F. Immediately thereafter the water was stirred with a common spoon. Within 10 seconds the entire mass of powder had sunk into the body of water and had been completely dispersed to form a stable reconstituted milk. Such reconstituted milk was substantially indistinguishable from fresh whole milk insofar as palatability, flavor and stability were concerned. The solubility index of the final product was about 0.20 ml.

*Example 2*

The wetback procedure was used as described in connection with FIGURE 3. The spray drier employed was as illustrated in FIGURE 2, except that the means for feeding lactose crystals was omitted and the drier was operated as conventional spray drying equipment to produce a finely divided anhydrous milk powder. The same whole milk concentrate referred to in Example 1 was supplied to such spray drying equipment, to produce an anhydrous whole milk powder having a total moisture content of about 2%. Substantially all of the lactose content of this powder was in the anhydrous form. The particle size was such that the majority of the powder passed through a 100 mesh screen. Lecithin in the same amount specified in Example 1 was supplied to the centrifugal atomizer head together with the whole milk concentrate. This lecithin was uniformly incorporated in the finely divided particles of dry milk powder. This was supplied to a converter as described in connection with FIGURE 3, where the particles were moistened and the resulting moist sticky particles brought into random contact to form moist porous aggregates. The amount of moisture added was such that the material leaving the converter contained about 15% moisture. Heat was supplied to the moistening zone by supplying some hot water vapor whereby the temperature of the moistening zone was about 110° F. The moist material leaving the converter was delivered to a conveyer where it remained in quiescent condition for a period of about 20 seconds, during which time it passed to drying equipment of the shaker type. Drying and sizing were carried out as described in Patent 2,835,586. The final product had all of the instant properties of the material produced by Example 1, and in general had similar characteristics. Here again the lecithin content was not dissolved in the fat, but was distributed in such a manner as to effectively enhance the wettability and dispersibility of the product in water.

We claim:
1. In a method for making dry fat-containing milk having instant properties in that when introduced into a quantity of water the product quickly wets and readily disperses upon simple stirring to form a stable recon- stituted milk, the steps of continuously supplying fat-containing liquid milk to a region of atomization, separately and continuously supplying extraneous lecithin in liquid form to said region, the amount of lecithin so supplied being such as to provide from about 0.17 to 0.6% lecithin in the final product, simultaneously effecting atomization of both the liquid milk and lecithin in said region without substantial dispersion of the lecithin in the fat, contacting the atomized droplets with a drying gas to produce discrete particles, causing the discrete particles in moist condition to contact and adhere together to form moist porous aggregates, and then removing excess moisture from the aggregates to form a dry product.

2. A method as in claim 1 in which the drying gas is controlled to produce moist sticky particles that are brought into random contact to form the moist porous aggregates.

3. A method as in claim 1 in which the drying gas is controlled to produce an anhydrous powder, after which moisture is added to the powder to cause the powder particles to be made moist and sticky, and the sticky particles brought into random contact to form the moist porous aggregates.

4. A method as in claim 1 in which the liquid milk and the lecithin are subjected to centrifugal atomization in said region.

References Cited in the file of this patent
UNITED STATES PATENTS

| | | |
|---|---|---|
| 2,201,064 | Thurman | May 14, 1940 |
| 2,399,565 | North et al. | Apr. 30, 1946 |
| 2,819,971 | Gunthardt | Jan. 14, 1958 |
| 2,921,857 | Sharp et al. | Jan. 19, 1960 |